(12) United States Patent
Zhang et al.

(10) Patent No.: US 12,293,574 B2
(45) Date of Patent: May 6, 2025

(54) OBSTACLE DETECTION METHOD, ELECTRONIC DEVICE AND STORAGE MEDIUM

(71) Applicant: Apollo Intelligent Driving Technology (Beijing) Co., Ltd.

(72) Inventors: Lei Zhang, Beijing (CN); Kai Yang, Beijing (CN); Qijuan Yin, Beijing (CN); Wuzhao Zhang, Beijing (CN); Xiaoyan Wang, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 454 days.

(21) Appl. No.: 17/814,461

(22) Filed: Jul. 22, 2022

(65) Prior Publication Data

US 2023/0072632 A1 Mar. 9, 2023

(30) Foreign Application Priority Data

Sep. 6, 2021 (CN) .......................... 202111039230.5

(51) Int. Cl.
*G06V 10/80* (2022.01)
*G06V 10/776* (2022.01)
*G06V 20/58* (2022.01)

(52) U.S. Cl.
CPC ............ *G06V 10/80* (2022.01); *G06V 10/776* (2022.01); *G06V 20/58* (2022.01)

(58) Field of Classification Search
CPC ...... G06V 10/80; G06V 10/776; G06V 20/58; Y02T 10/40; G06F 18/254; G06F 18/25;
(Continued)

(56) References Cited

U.S. PATENT DOCUMENTS 9,919,704 B1 * 3/2018 Kundu ................ H04N 13/243
11,126,197 B2 * 9/2021 Chen ........................ G06N 3/08
(Continued)

FOREIGN PATENT DOCUMENTS

CN 105372654 A 3/2016
CN 106802668 A 6/2017
(Continued)

OTHER PUBLICATIONS

Extended European Search Report for EP22175339.5, issued on Oct. 28, 2022, 7 pgs.
(Continued)

*Primary Examiner* — Charles T Shedrick
(74) *Attorney, Agent, or Firm* — Kwan & Olynick LLP

(57) ABSTRACT

There is provided an obstacle detection method, an electronic device and a storage medium, which relates to the field of computer technologies, and particularly to the fields of autonomous driving technologies, intelligent transportation technologies, Internet of Things technologies, deep learning technologies, or the like. The method for detecting obstacle includes: detecting an obstacle in a vehicle traveling process using plural obstacle detection manners to obtain plural initial detection results of the obstacle, the plural initial detection results corresponding to the plural obstacle detection manners; fusing the plural initial detection results to obtain a fusion result; and obtaining a final detection result of the obstacle based on the fusion result.

6 Claims, 4 Drawing Sheets

(58) Field of Classification Search
CPC ..... G01S 17/931; B60W 40/02; B60W 50/00; B60W 2050/0005; B60W 2050/0043; B60W 2552/50; B60W 2554/20; B60W 2554/40; B60W 2556/20; B60W 2556/25; B60W 2556/35

See application file for complete search history.

(56) References Cited

U.S. PATENT DOCUMENTS

| | | | |
|---|---|---|---|
| 11,391,579 B2* | 7/2022 | Forsberg | B60W 60/0011 |
| 11,597,397 B2* | 3/2023 | Kondo | B60W 50/0205 |
| 11,698,459 B2* | 7/2023 | Chi | G01S 17/931 |
| | | | 382/104 |
| 2018/0165829 A1* | 6/2018 | Hong | G06V 10/772 |
| 2018/0349715 A1* | 12/2018 | Gupta | G08G 1/20 |
| 2020/0042781 A1* | 2/2020 | Zuckerman | H04N 7/181 |
| 2020/0104612 A1* | 4/2020 | Chen | G01S 17/42 |
| 2020/0175714 A1 | 6/2020 | Hong et al. | |
| 2020/0294257 A1* | 9/2020 | Yoo | G06N 3/045 |
| 2020/0364472 A1* | 11/2020 | Liu | H04W 4/029 |
| 2021/0224562 A1* | 7/2021 | Zhan | G06V 20/58 |
| 2022/0383640 A1* | 12/2022 | Vora | G06V 10/40 |
| 2023/0061830 A1* | 3/2023 | Choi | G06V 20/70 |
| 2023/0072632 A1* | 3/2023 | Zhang | G06V 10/80 |
| 2023/0072730 A1* | 3/2023 | Yin | G06V 20/58 |
| 2023/0222618 A1* | 7/2023 | Yang | G06T 1/0007 |
| | | | 348/222.1 |
| 2023/0306750 A1* | 9/2023 | Zhao | G06V 10/806 |
| 2024/0005626 A1* | 1/2024 | Zhang | G06V 10/806 |
| 2024/0054794 A1* | 2/2024 | Valstar | G06V 10/811 |
| 2024/0151855 A1* | 5/2024 | Chattopadhyay | G01S 17/89 |
| 2024/0161474 A1* | 5/2024 | Zu | G06N 3/0464 |
| 2024/0331403 A1* | 10/2024 | Shen | G06V 10/143 |
| 2024/0404025 A1* | 12/2024 | Zhang | G06T 5/60 |

FOREIGN PATENT DOCUMENTS

| | | | |
|---|---|---|---|
| CN | 108313088 | A | 7/2018 |
| CN | 108482427 | A | 9/2018 |
| CN | 108764108 | A | 11/2018 |
| CN | 109188460 | A | 1/2019 |
| CN | 109270524 | A | 1/2019 |
| CN | 109544990 | A | 3/2019 |
| CN | 110609570 | A | 12/2019 |
| CN | 111198371 | A | 5/2020 |
| CN | 111273268 | A | 6/2020 |
| CN | 111308461 | A | 6/2020 |
| CN | 111338383 | A | 6/2020 |
| CN | 111551938 | A | 8/2020 |
| CN | 111753765 | A | 10/2020 |
| CN | 112113578 | A | 12/2020 |
| CN | 212322114 | U | 1/2021 |
| CN | 112330746 | A | 2/2021 |
| CN | 112394726 | A | 2/2021 |
| CN | 112639821 | A | 4/2021 |
| CN | 112651359 | A | 4/2021 |
| CN | 113269260 | A | 8/2021 |
| JP | 2002099906 | A | 4/2002 |
| JP | 2015078926 | A | 4/2015 |
| JP | 2017159801 | A | 9/2017 |
| JP | 2019175423 | A | 10/2019 |
| JP | 2020190845 | A | 11/2020 |
| KR | 101803195 | B1 | 11/2017 |
| KR | 20180068578 | A | 6/2018 |
| WO | 2017154456 | A1 | 9/2017 |

OTHER PUBLICATIONS

First office action for CN202111039230.5, issued on Apr. 27, 2023, 11 pgs.
Lei Zhang, et al., Target Detection and Tracking System of Unmanned Surface Vehicles, Dec. 31, 2018, 1 pg.
First office action for JP2022-122815, issued on Aug. 15, 2023, 2 pgs.
Guang-yao Zhai, et al., Tramway Obstacles Detection Based On Information Fusion of MMV, Sep. 30, 2017, 17 pgs.
Linli Lu, et al., Fast Obstacle Detection Based On Multi-Sensor Information Fusion, Nov. 24, 2014, 7 pgs.
Notice of allowance for CN202111039230.5, issued on Aug. 2, 2023, 4 pgs.
First office action for KR10-2022-0092526, issued on Nov. 29, 2023, 6 pgs.
Notice of Allowance for JP2022-122815 issued on Feb. 13, 2024, 1 pg.

* cited by examiner

OBSTACLE DETECTION METHOD, ELECTRONIC DEVICE AND STORAGE MEDIUM

The present application claims the priority of Chinese Patent Application No. 202111039230.5, filed on Sep. 6, 2021, with the title of "OBSTACLE DETECTION METHOD AND APPARATUS, AUTONOMOUS VEHICLE, DEVICE AND STORAGE MEDIUM". The disclosure of the above application is incorporated herein by reference in its entirety.

FIELD OF THE DISCLOSURE

The present disclosure relates to the field of computer technologies, and particularly relates to the fields of autonomous driving technologies, intelligent transportation technologies, Internet of Things technologies, deep learning technologies, or the like, and particularly to an obstacle detection method, an electronic device and a storage medium.

BACKGROUND OF THE DISCLOSURE

An autonomous vehicle or self-driving automobile is also called an unmanned vehicle, a computer-driven vehicle or a wheeled mobile robot, and is an intelligent vehicle using a computer system to realize an unmanned driving operation.

In many scenarios, for example, for the autonomous vehicle, in order to guarantee driving safety of the autonomous vehicle, an obstacle is required to be effectively detected in time.

In a related art, the obstacle is usually detected using a single obstacle detection method.

SUMMARY OF THE DISCLOSURE

The present disclosure provides an obstacle detection method, an electronic device and a storage medium.

According to one aspect of the present disclosure, there is provided a method for detecting obstacle, including: detecting an obstacle in a vehicle traveling process using plural obstacle detection manners to obtain plural initial detection results of the obstacle, the plural initial detection results corresponding to the plural obstacle detection manners; fusing the plural initial detection results to obtain a fusion result; and obtaining a final detection result of the obstacle based on the fusion result.

According to another aspect of the present disclosure, there is provided an electronic device, including: at least one processor; and a memory communicatively connected with the at least one processor; wherein the memory stores instructions executable by the at least one processor, and the instructions are executed by the at least one processor to enable the at least one processor to perform a method for detecting obstacle, wherein the method includes: detecting an obstacle in a vehicle traveling process using plural obstacle detection manners to obtain plural initial detection results of the obstacle, the plural initial detection results corresponding to the plural obstacle detection manners; fusing the plural initial detection results to obtain a fusion result; and obtaining a final detection result of the obstacle based on the fusion result.

According to another aspect of the present disclosure, there is provided anon-transitory computer readable storage medium with computer instructions stored thereon, wherein the computer instructions are used for causing a method for detecting obstacle, wherein the method includes: detecting an obstacle in a vehicle traveling process using plural obstacle detection manners to obtain plural initial detection results of the obstacle, the plural initial detection results corresponding to the plural obstacle detection manners; fusing the plural initial detection results to obtain a fusion result; and obtaining a final detection result of the obstacle based on the fusion result.

According to another aspect of the present disclosure, there is provided an autonomous vehicle, including the electronic device according to any one of the above-mentioned aspects.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

In a related art, an obstacle is usually detected using a single obstacle detection method. For example, a laser radar may be used to detect the obstacle, and an obstacle detection result of the laser radar is used as a final obstacle detection result; or, an image captured by a camera on an autonomous vehicle may be processed to obtain an obstacle detection result which is used as the final obstacle detection result.

However, the single obstacle detection method may have a problem of inaccurate detection.

Figure 1:
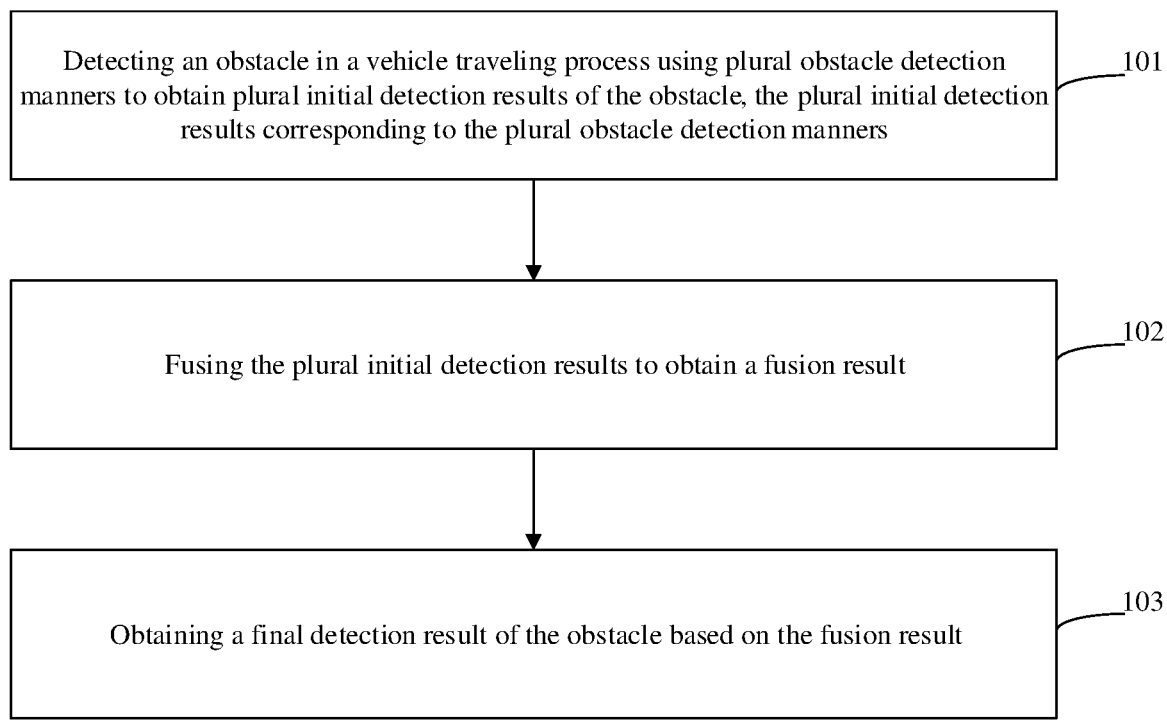
FIG. 1 is a schematic diagram according to a first embodiment of the present disclosure.

FIG. 1 is a schematic diagram according to a first embodiment of the present disclosure, and the present embodiment provides a method for detecting obstacle, including:

101: detecting an obstacle in a vehicle traveling process using plural obstacle detection manners to obtain plural initial detection results of the obstacle, the plural initial detection results corresponding to the plural obstacle detection manners.

102: fusing the plural initial detection results to obtain a fusion result.

103: determining a final detection result based on relevance information among plural obstacle sensors, the plural obstacle detection results and accuracy of the plural obstacle detection results.

A vehicle may be an autonomous vehicle, or a vehicle having an advanced driving assistance system (ADAS).

The plural obstacle detection manners may include: a ranging-based obstacle detection manner, an obstacle detection manner based on computer vision, or the like.

The ranging-based obstacle detection manner may be performed using a ranging detection device on the vehicle, and the ranging detection device includes, for example, a laser radar, a millimeter wave radar, or the like.

In the obstacle detection method based on computer vision, environmental images around the vehicle may be collected by a camera on the vehicle, and subsequently processed by a processor of the vehicle, or the environmental images are sent to a cloud by the vehicle and subsequently processed by the cloud, thereby obtaining an obstacle detection result based on the computer vision.

Figure 2:
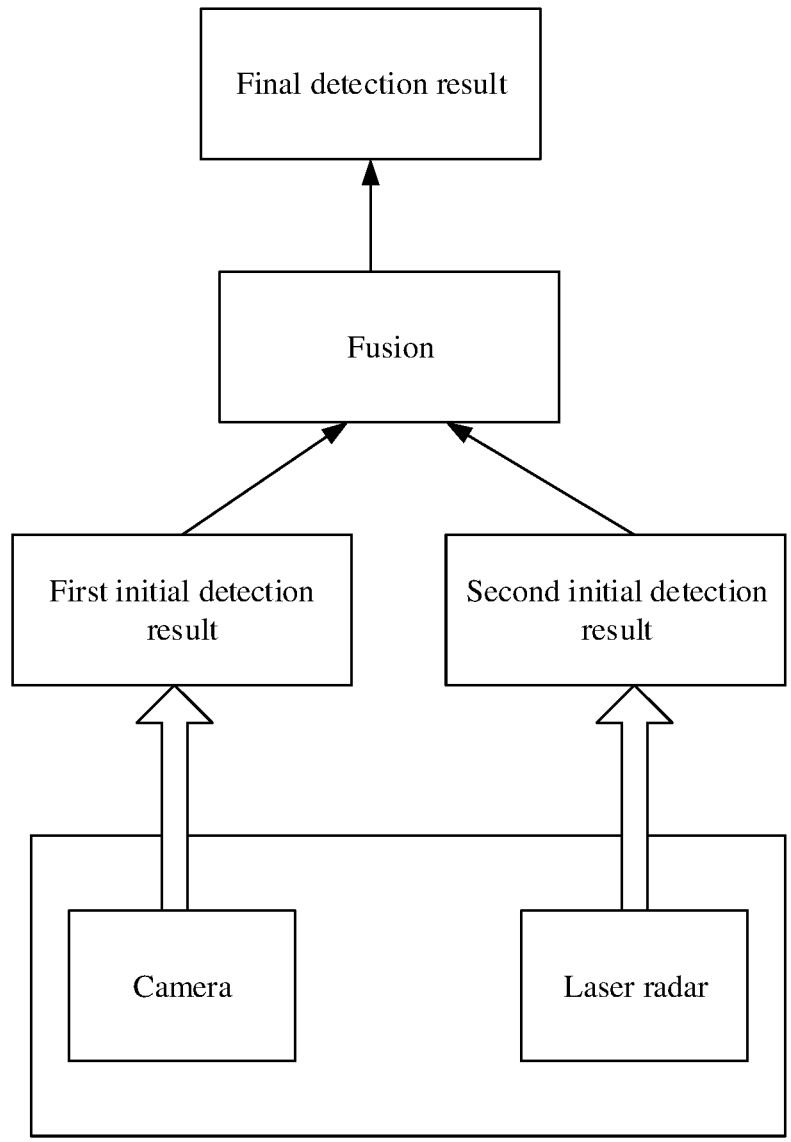
FIG. 2 is a schematic diagram according to a second embodiment of the present disclosure.

Taking the autonomous vehicle as an example, assuming that the plural obstacle detection manners include the ranging-based obstacle detection manner and the obstacle detection manner based on computer vision, and a ranging operation is performed based on the laser radar, as shown in FIG. 2, the laser radar, the camera, or the like, may be mounted on the autonomous vehicle, such that one detection result may be obtained by the laser radar on the autonomous vehicle, and another detection result may be obtained by the camera on the autonomous vehicle. For distinction, the detection results at this point may be referred to as the initial detection results, and further, the detection result obtained by the laser radar may be referred to as a first initial detection result, and the detection result obtained by the camera may be referred to as a second initial detection result.

Further, as shown in FIG. 2, after obtained, the plural initial detection results may be fused to obtain the fusion result, and then, the final detection result may be obtained based on the fusion result.

In some embodiments, each of the plural initial detection results is used to indicate whether an obstacle exists, and the fusing the plural initial detection results to obtain a fusion result includes: selecting an initial detection result used to indicate existence of the obstacle from the plural initial detection results as a to-be-processed detection result; obtaining fusion information of the to-be-processed detection result; and obtaining the fusion result based on the fusion information of the to-be-processed detection result.

The initial detection result may be 1 or 0, 1 indicating the existence of the obstacle, and 0 indicating inexistence of the obstacle.

Assuming that there exist three initial detection results which are represented as a first initial detection result, a second initial detection result and a third initial detection result respectively, if the first initial detection result is 1, the second initial detection result is 1, and the third initial detection result is 0, the to-be-processed detection results are the first initial detection result and the second initial detection result.

Then, fusion information of the first initial detection result and the second initial detection result may be obtained, and the fusion result may be obtained based on the fusion information.

By selecting the initial detection result for indicating the existence of the obstacle from the plural initial detection results and subsequently processing the selected initial detection result, a processing amount may be reduced, and a processing efficiency may be improved.

In some embodiments, there exist plural to-be-processed detection results, and the fusion information of the to-be-processed detection results includes: accuracy information of each of the plural to-be-processed detection results and relevance information between every two of the plural to-be-processed detection results; and the obtaining fusion information of the to-be-processed detection result includes: detecting environmental information of the vehicle by a pre-established accuracy detection model to obtain the accuracy information of each to-be-processed detection result; and obtaining relevance information between every two obstacle detection manners corresponding to the every two to-be-processed detection results from a pre-configured configuration file, and taking the relevance information as the relevance information between the every two to-be-processed detection results.

Assuming that the to-be-processed detection results include: the first initial detection result and the second initial detection result, the accuracy information of the first initial detection result and the accuracy information of the second initial detection result may be obtained, and in addition, the relevance information between the first initial detection result and the second initial detection result may be obtained, and the accuracy information and the relevance information are used as the fusion information.

The accuracy detection model may be pre-established, the model may be a multi-layer perceptron (MLP) model, input of the model is the environmental information corresponding to the autonomous vehicle, and output thereof is the accuracy information corresponding to various obstacle detection manners among the plural obstacle detection manners of the autonomous vehicle.

The model may be obtained after a training operation using historical environmental information and corresponding label information, and the label information may be obtained after the accuracy information of various obstacle detection manners corresponding to the historical environmental information is manually marked.

The environmental information corresponding to the autonomous vehicle may include: weather conditions (sunny, rain, snow, or the like), light intensity, rain intensity, snow intensity, fog intensity, a temperature, a vehicle speed, an obstacle speed, a distance from the obstacle, or the like.

The above-mentioned environmental information may be obtained by detection of a sensor on the vehicle, or obtained by the vehicle from the cloud.

Figure 3:
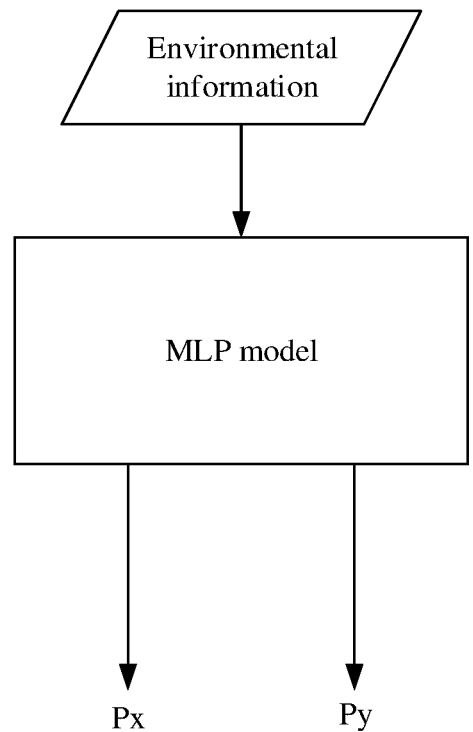
FIG. 3 is a schematic diagram according to a third embodiment of the present disclosure.

For example, the plural obstacle detection manners correspond to the laser radar and the camera respectively, and the accuracy of the initial detection result corresponding to the laser radar and the accuracy of the initial detection result corresponding to the camera under the current environmental information may be obtained by the accuracy detection model. Assuming that the accuracy detection model is a MLP model, the accuracy of the initial detection result corresponding to the laser radar is represented by Px, and the accuracy of the initial detection result corresponding to the camera is represented by Py, the MLP model may process the environmental information and output Px and Py, as shown in FIG. 3.

In addition, the configuration file may be stored in the cloud or the vehicle, and relevance information between different obstacle detection manners may be pre-configured in the configuration file; for example, the relevance information between the detection method corresponding to the laser radar and the detection method corresponding to the camera may be configured, and then, the relevance information may be used as the relevance information between the corresponding initial detection results.

The two obstacle detection manners are taken as an example in the above description, and it may be understood a similar processing operation may be performed for more obstacle detection manners. For example, for three obstacle detection manners of the obstacle detection method corresponding to the laser radar, an obstacle detection method corresponding to the millimeter wave radar, and the obstacle detection method corresponding to the camera, the initial detection results corresponding to the three obstacle detection manners are a first initial detection result, a second initial detection result, and a third initial detection result respectively. If all the three initial detection results indicate that the obstacle exists, for example, are 1, the accuracy information of the first initial detection result, the accuracy information of the second initial detection result, and the accuracy information of the third initial detection result may be obtained by the accuracy detection model. In addition, relevance information between the obstacle detection method corresponding to the laser radar and the obstacle detection method corresponding to the millimeter wave radar, relevance information between the obstacle detection method corresponding to the millimeter wave radar and the obstacle detection method corresponding to the camera, and relevance information between the obstacle detection method corresponding to the laser radar and the obstacle detection method corresponding to the camera may be pre-configured in the configuration file, and then, a fusion processing operation may be performed based on the three types of accuracy information and the three types of relevance information to obtain the fusion result.

By the accuracy detection model and the configuration file, the corresponding accuracy information and the corresponding relevance information may be obtained adaptively.

In some embodiments, there exist plural to-be-processed detection results, and the fusion information of the to-be-processed detection results includes: accuracy information of each of the plural to-be-processed detection results and relevance information between two of the plural to-be-processed detection results; and the obtaining the fusion result based on the fusion information of the to-be-processed detection results includes: sorting the accuracy information of all the to-be-processed detection results in a descending order to obtain sorted accuracy information; and obtaining the fusion result using a preset functional relationship based on the sorted accuracy information and the relevance information between every two to-be-processed detection results, the preset functional relationship being used to indicate a relationship between the fusion result and the accuracy information and the relevance information.

The accuracy information may be divided into a first part and a second part, and the relevance information is relevance information between the first part and the second part. In the preset functional relationship, the fusion result is in a direct proportion relationship with one of the two pieces of accuracy information and a product of the other of the two pieces of accuracy information and the relevance information.

Further, for two to-be-processed detection results, each of the first part and the second part may be one to-be-processed detection result. For three or more to-be-processed detection results, the second part may be one to-be-processed detection result; the first part may include a variable number of to-be-processed detection results, and an initial value is one to-be-processed detection result, and then may be increased step by step.

Specifically, assuming that the two to-be-processed detection results are represented by x and y respectively, the corresponding accuracy information is Px and Py after sorted in a descending order, the relevance information of the two to-be-processed detection results is represented as Rxy, and the fusion result is represented by P, a calculation formula of the fusion result P may be as follows:

$$P=1-(1-Px)*(1-Py*Rxy).$$

wherein Px, Py and Rxy are values within [0,1].

Assuming that the two to-be-processed detection results are the initial detection result corresponding to the laser radar and the initial detection result corresponding to the camera respectively, if the accuracy information of the initial detection result corresponding to the laser radar is 0.8, the accuracy information of the initial detection result corresponding to the camera is 0.9, and the pre-configured relevance information between the two initial detection results is 0.1, the fusion result P is as follows through the above operation:

$$P=1-(1-0.9)*(1-0.8*0.1)=0.972.$$

Taking three to-be-processed detection results as an example, assuming that the three to-be-processed detection results are represented by x, y and z respectively, corresponding accuracy information is Px, Py and Pz after sorted in a descending order, relevance information between every two of the three to-be-processed detection results is represented as Rxy, Rxz and Ryz, and the fusion result is represented by P, a calculation formula of the fusion result P may be as follows:

$$Pxy=1-(1-Px)*(1-Py*Rxy);$$

$$P=1-(1-Pxy)*(1-Pz*Rxyz)$$

wherein Rxyz is selected to be a smaller value of Rxz and Ryz.

Px, Py, Pz, Rxy, Rxz and Ryz are values within [0,1].

By sorting the accuracy information and calculating the fusion result based on the sorted accuracy information and the relevance information, the accuracy of the fusion result may be increased.

In some embodiments, the obtaining a final detection result of the obstacle based on the fusion result includes: if the fusion information is greater than or equal to a preset threshold, determining that the final detection result is the existence of the obstacle.

Taking the above fusion result P=0.972 as an example, if the preset threshold is 0.5, since 0.972 is greater than 0.5, an obstacle exists at this point.

Otherwise, if the fusion information is less than the preset threshold, it is determined that no obstacle exists at this point.

By comparing the fusion information with the preset threshold, the final detection result may be determined simply, conveniently and efficiently.

Further, the autonomous vehicle may perform a corresponding operation based on the final detection result of the obstacle; for example, when the final detection result is the existence of the obstacle, a braking operation may be performed.

In the embodiment of the present disclosure, the plural initial detection results are obtained using the plural obstacle detection manners, the initial detection results are fused, and the final detection result of the obstacle is obtained based on the fusion result, thereby realizing the fusion of the plural obstacle detection manners, and improving obstacle detection accuracy.

Figure 4:
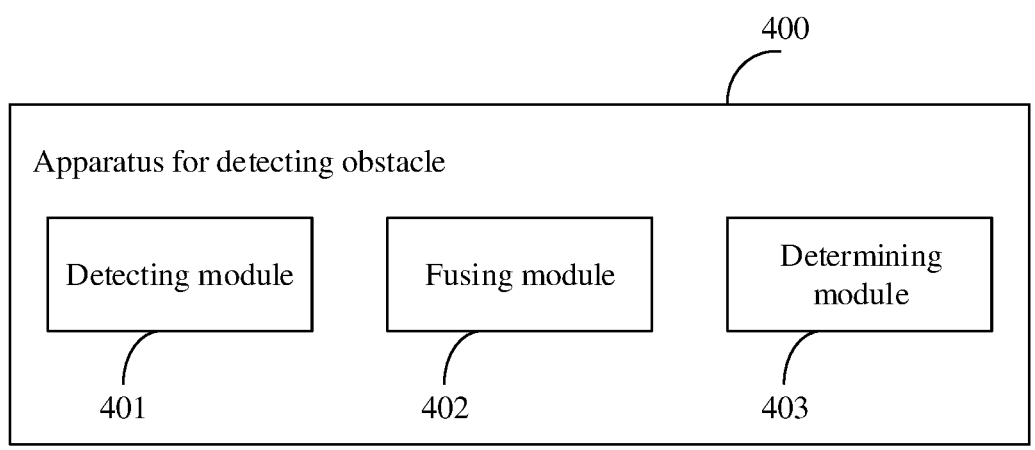
FIG. 4 is a schematic diagram according to a fourth embodiment of the present disclosure.

FIG. 4 is a schematic diagram according to a fourth embodiment of the present disclosure, and the present embodiment provides an apparatus for detecting obstacle. As shown in FIG. 4, the apparatus 400 includes: a detecting module 401, a fusing module 402 and a determining module 403.

The detecting module 401 is configured to detect an obstacle in a vehicle traveling process using plural obstacle detection manners to obtain plural initial detection results of the obstacle, the plural initial detection results corresponding to the plural obstacle detection manners; the fusing module 402 is configured to fuse the plural initial detection results to obtain a fusion result; and the determining module 403 is configured to obtain a final detection result of the obstacle based on the fusion result.

In some embodiments, each of the plural initial detection results is used to indicate whether an obstacle exists, and the fusing module 402 is specifically configured to: select an initial detection result used to indicate existence of the obstacle from the plural initial detection results as a to-be-processed detection result; obtain fusion information of the to-be-processed detection result; and obtain the fusion result based on the fusion information of the to-be-processed detection result.

In some embodiments, there exist plural to-be-processed detection results, and the fusion information of the to-be-processed detection results includes: accuracy information of each of the plural to-be-processed detection results and relevance information between every two of the plural to-be-processed detection results; and the fusing module 402 is further specifically configured to: detect environmental information of the vehicle by a pre-established accuracy detection model to obtain the accuracy information of each to-be-processed detection result; and obtain relevance information between every two obstacle detection manners corresponding to the every two to-be-processed detection results from a pre-configured configuration file, and take the obtained relevance information as the relevance information between the every two to-be-processed detection results.

In some embodiments, there exist plural to-be-processed detection results, and the fusion information of the to-be-processed detection results includes: accuracy information of each of the plural to-be-processed detection results and relevance information between every two of the plural to-be-processed detection results; and the fusing module 402 is further specifically configured to: sort the accuracy information of all the to-be-processed detection results in a descending order to obtain sorted accuracy information; and obtain the fusion result using a preset functional relationship based on the sorted accuracy information and the relevance information between every two to-be-processed detection results, the preset functional relationship being used to indicate a relationship between the fusion result and the accuracy information and the relevance information.

In some embodiments, the determining module 403 is specifically configured to: if the fusion information is greater than or equal to a preset threshold, determine that the final detection result is the existence of the obstacle.

In the embodiment of the present disclosure, the plural initial detection results are obtained using the plural obstacle detection manners, the initial detection results are fused, and the final detection result of the obstacle is obtained based on the fusion result, thereby realizing the fusion of the plural obstacle detection manners, and improving obstacle detection accuracy.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

According to the embodiment of the present disclosure, there are also provided an electronic device, a readable storage medium and a computer program product.

Figure 5:
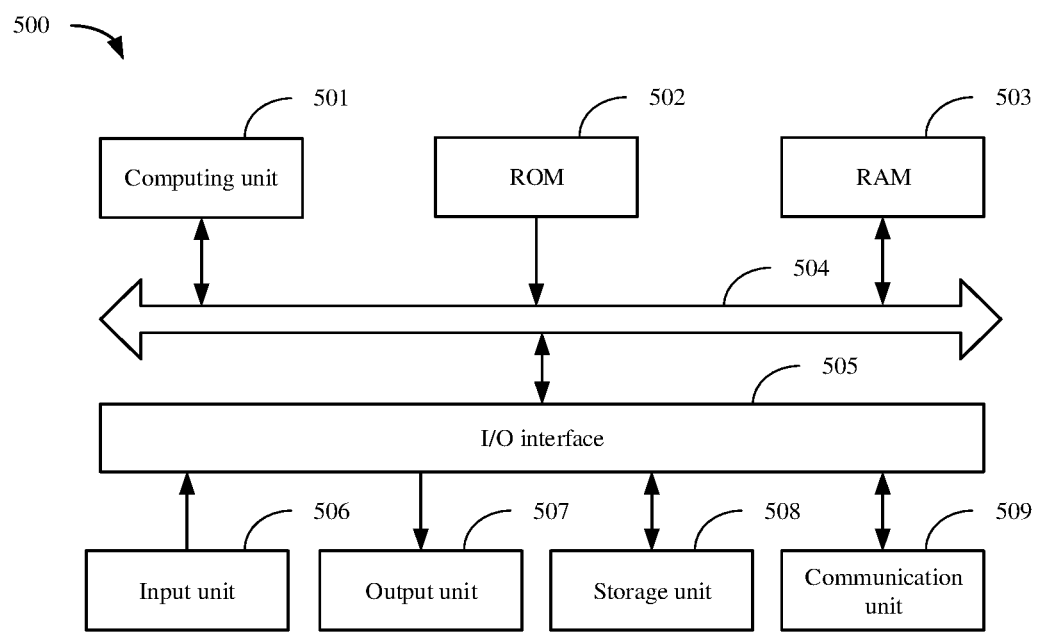
FIG. 5 is a schematic diagram of an electronic device configured to implement any of methods for detecting obstacle according to the embodiments of the present disclosure.

FIG. 5 shows a schematic block diagram of an exemplary electronic device 500 which may be configured to implement the embodiment of the present disclosure. The electronic device is intended to represent various forms of digital computers, such as laptop computers, desktop computers, workstations, servers, blade servers, mainframe computers, and other appropriate computers. The electronic device may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 5, the electronic device 500 includes a computing unit 501 which may perform various appropriate actions and processing operations according to a computer program stored in a read only memory (ROM) 502 or a computer program loaded from a storage unit 505 into a random access memory (RAM) 503. Various programs and data necessary for the operation of the electronic device 500 may be also stored in the RAM 503. The computing unit 501, the ROM 502, and the RAM 503 are connected with one other through a bus 504. An input/output (I/O) interface 505 is also connected to the bus 504.

The plural components in the electronic device 500 are connected to the I/O interface 505, and include: an input unit 506, such as a keyboard, a mouse, or the like; an output unit 507, such as various types of displays, speakers, or the like; the storage unit 508, such as a magnetic disk, an optical disk, or the like; and a communication unit 509, such as a network card, a modem, a wireless communication transceiver, or the like. The communication unit 509 allows the electronic device 500 to exchange information/data with other devices through a computer network, such as the Internet, and/or various telecommunication networks.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 501 performs the methods and processing operations described above, such as the method for detecting obstacle. For example, in some embodiments, the obstacle detection method may be implemented as a computer software program tangibly contained in a machine readable medium, such as the storage unit 508. In some embodiments, part or all of the computer program may be loaded and/or installed into the electronic device 500 via the ROM 502 and/or the communication unit 509. When the computer program is loaded into the RAM 503 and executed by the computing unit 501, one or more steps of the obstacle detection method described above may be performed. Alternatively, in other embodiments, the computing unit 501 may be configured to perform the obstacle detection method by any other suitable means (for example, by means of firmware).

According to the embodiment of the present disclosure, the present disclosure further provides an autonomous vehicle, including the electronic device as shown in FIG. 5.

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A method for detecting obstacle, comprising:
    detecting an obstacle in a vehicle traveling process using plural obstacle detection manners to obtain plural initial detection results of the obstacle, the plural initial detection results corresponding to the plural obstacle detection manners;
    fusing the plural initial detection results to obtain a fusion result; and obtaining a final detection result of the obstacle based on the fusion result, wherein each of the plural initial detection results is used to indicate whether an obstacle exists, and the fusing the plural initial detection results to obtain a fusion result comprises:

selecting an initial detection result used to indicate the existence of the obstacle from the plural initial detection results as a to-be-processed detection result;

obtaining fusion information of the to-be-processed detection result; and obtaining the fusion result based on the fusion information of the to-be-processed detection result, wherein there exist plural to-be-processed detection results, and the fusion information of the to-be-processed detection results comprises: accuracy information of each of the plural to-be-processed detection results and relevance information between every two of the plural to-be-processed detection results; and the obtaining the fusion result based on the fusion information of the to-be-processed detection result comprises:

sorting the accuracy information of all the to-be-processed detection results in a descending order to obtain sorted accuracy information; and obtaining the fusion result using a preset functional relationship based on the sorted accuracy information and the relevance information between the every two to-be-processed detection results, the preset functional relationship being used to indicate a relationship between the fusion result and the sorted accuracy information and the relevance information, wherein the sorted accuracy information comprises two pieces of accuracy information, and in the preset functional relationship, the fusion result is in a direct proportion relationship with one of the two pieces of accuracy information and a product of the other of the two pieces of accuracy information and the relevance information, wherein the obtaining a final detection result of the obstacle based on the fusion result comprises:

if the fusion information is greater than or equal to a preset threshold, determining that the final detection result is the existence of the obstacle.

2. The method according to claim 1, wherein the obtaining fusion information of the to-be-processed detection result comprises:

detecting environmental information of the vehicle by a pre-established accuracy detection model to obtain the accuracy information of each to-be-processed detection result; and obtaining relevance information between every two obstacle detection manners corresponding to the every two to-be-processed detection results from a pre-configured configuration file, and taking the obtained relevance information as the relevance information between the every two to-be-processed detection results.

3. An electronic device, comprising:

at least one processor; and a memory communicatively connected with the at least one processor;

wherein the memory stores instructions executable by the at least one processor, and the instructions are executed by the at least one processor to enable the at least one processor to perform a method for detecting obstacle, wherein the method comprises:

detecting an obstacle in a vehicle traveling process using plural obstacle detection manners to obtain plural initial detection results of the obstacle, the plural initial detection results corresponding to the plural obstacle detection manners;

fusing the plural initial detection results to obtain a fusion result; and obtaining a final detection result of the obstacle based on the fusion result, wherein each of the plural initial detection results is used to indicate whether an obstacle exists, and the fusing the plural initial detection results to obtain a fusion result comprises:

selecting an initial detection result used to indicate the existence of the obstacle from the plural initial detection results as a to-be-processed detection result;

obtaining fusion information of the to-be-processed detection result; and obtaining the fusion result based on the fusion information of the to-be-processed detection result, wherein there exist plural to-be-processed detection results, and the fusion information of the to-be-processed detection results comprises: accuracy information of each of the plural to-be-processed detection results and relevance information between every two of the plural to-be-processed detection results; and the obtaining the fusion result based on the fusion information of the to-be-processed detection result comprises:

sorting the accuracy information of all the to-be-processed detection results in a descending order to obtain sorted accuracy information; and obtaining the fusion result using a preset functional relationship based on the sorted accuracy information and the relevance information between the every two to-be-processed detection results, the preset functional relationship being used to indicate a relationship between the fusion result and the sorted accuracy information and the relevance information, wherein the sorted accuracy information comprises two pieces of accuracy information, and in the preset functional relationship, the fusion result is in a direct proportion relationship with one of the two pieces of accuracy information and a product of the other of the two pieces of accuracy information and the relevance information, wherein the obtaining a final detection result of the obstacle based on the fusion result comprises:

if the fusion information is greater than or equal to a preset threshold, determining that the final detection result is the existence of the obstacle.

4. The electronic device according to claim 3, wherein the obtaining fusion information of the to-be-processed detection result comprises:

detecting environmental information of the vehicle by a pre-established accuracy detection model to obtain the accuracy information of each to-be-processed detection result; and obtaining relevance information between every two obstacle detection manners corresponding to the every two to-be-processed detection results from a pre-configured configuration file, and take the obtained relevance information as the relevance information between the every two to-be-processed detection results.

5. A non-transitory computer readable storage medium with computer instructions stored thereon, wherein the computer instructions are used for causing a method for detecting obstacle, wherein the method comprises:

detecting an obstacle in a vehicle traveling process using plural obstacle detection manners to obtain plural initial detection results of the obstacle, the plural initial detection results corresponding to the plural obstacle detection manners;

fusing the plural initial detection results to obtain a fusion result; and obtaining a final detection result of the obstacle based on the fusion result, wherein each of the plural initial detection results is used to indicate whether an obstacle exists, and the fusing the plural initial detection results to obtain a fusion result comprises:

selecting an initial detection result used to indicate the existence of the obstacle from the plural initial detection results as a to-be-processed detection result;

obtaining fusion information of the to-be-processed detection result; and obtaining the fusion result based on the fusion information of the to-be-processed detection result, wherein there exist plural to-be-processed detection results, and the fusion information of the to-be-processed detection results comprises: accuracy information of each of the plural to-be-processed detection results and relevance information between every two of the plural to-be-processed detection results; and the obtaining the fusion result based on the fusion information of the to-be-processed detection result comprises:

sorting the accuracy information of all the to-be-processed detection results in a descending order to obtain sorted accuracy information; and obtaining the fusion result using a preset functional relationship based on the sorted accuracy information and the relevance information between the every two to-be-processed detection results, the preset functional relationship being used to indicate a relationship between the fusion result and the sorted accuracy information and the relevance information, wherein the sorted accuracy information comprises two pieces of accuracy information, and in the preset functional relationship, the fusion result is in a direct proportion relationship with one of the two pieces of accuracy information and a product of the other of the two pieces of accuracy information and the relevance information, wherein the obtaining a final detection result of the obstacle based on the fusion result comprises:

if the fusion information is greater than or equal to a preset threshold, determining that the final detection result is the existence of the obstacle.

6. The non-transitory computer readable storage medium according to claim 5, the obtaining fusion information of the to-be-processed detection result comprises:

detecting environmental information of the vehicle by a pre-established accuracy detection model to obtain the accuracy information of each to-be-processed detection result; and obtaining relevance information between every two obstacle detection manners corresponding to the every two to-be-processed detection results from a pre-configured configuration file, and taking the obtained relevance information as the relevance information between the every two to-be-processed detection results.

\* \* \* \* \*